US012257550B2

(12) United States Patent
Warsinger et al.

(10) Patent No.: US 12,257,550 B2
(45) Date of Patent: Mar. 25, 2025

(54) THERMAL VAPOR COMPRESSION MEMBRANE DISTILLATION HYBRID USING VAPOR SELECTIVE MEMBRANES

(71) Applicant: Purdue Research Foundation, West Lafayette, IN (US)

(72) Inventors: David Warsinger, West Lafayette, IN (US); Abhimanyu Das, West Lafayette, IN (US); Hamid Fattahijuybari, West Lafayette, IN (US); Harsharaj Parmar, Toronto (CA)

(73) Assignee: Purdue Research Foundation, West Lafayette, IN (US)

( * ) Notice: Subject to any disclaimer, the term of this patent is extended or adjusted under 35 U.S.C. 154(b) by 378 days.

(21) Appl. No.: 17/533,868

(22) Filed: Nov. 23, 2021

(65) Prior Publication Data

US 2022/0161194 A1   May 26, 2022

Related U.S. Application Data

(60) Provisional application No. 63/117,519, filed on Nov. 24, 2020.

(51) Int. Cl.
*B01D 1/28* (2006.01)
*B01D 1/00* (2006.01)
(Continued)

(52) U.S. Cl.
CPC ......... *B01D 61/368* (2013.01); *B01D 1/0035* (2013.01); *B01D 1/289* (2013.01);
(Continued)

(58) Field of Classification Search
None
See application file for complete search history.

(56) References Cited

U.S. PATENT DOCUMENTS

2013/0277199 A1* 10/2013 Summers ............. B01D 61/364
202/234
2014/0290247 A1* 10/2014 Mishima ................ F03G 6/067
60/641.9

(Continued)

*Primary Examiner* — Hayden Brewster
(74) *Attorney, Agent, or Firm* — David E. Novak; Brannon Sowers & Cracraft PC

(57) ABSTRACT

A desalination system, including a membrane distillation portion, a solar power concentration portion, and a thermal vapor compression portion operationally connected to the membrane distillation portion and to the solar power concentration portion. The membrane distillation portion includes a first vessel having a first portion and a second portion separated by a hydrophobic membrane operationally connected therebetween and oriented to pass water from the first portion to the second portion, wherein the hydrophobic membrane further comprises a hydrophilic membrane and an air blocking layer connected to the hydrophilic membrane and disposed in the first portion, a vacuum gap adjacent the hydrophobic membrane and disposed in the second portion, a first fluid inlet and a first fluid outlet operationally connected to the first portion, and a second fluid inlet and a second fluid outlet operationally connected to the second portion. The solar power concentration portion includes a pump having a pump outlet and a pump inlet operationally connected to a water line and to the vacuum gap, a linear Fresnel mirror collector for collecting and focusing sunlight, and an outlet line operationally connected to the pump outlet and positioned to receive focused sunlight from linear Fresnel mirror collector. The thermal vapor compression portion includes an ejector having an ejector inlet portion and an ejector outlet portion, wherein the ejector inlet portion is operationally connected to the outlet line and to the vacuum gap, a second vessel fluidically connected to the outlet portion and further including a heat exchanger operationally connected to the ejector outlet portion and to a water pipe, a feed spray operationally connected to the second (Continued)

outlet and positioned to spray into the heat exchanger, and a collection portion for receiving concentrated feed spray. The heat exchanger receives desalinated water from the ejector and from the feed spray. The water line carries desalinated water from the heat exchanger. The first outlet passes concentrated brine, and the first inlet receives feed water to be desalinated.

13 Claims, 10 Drawing Sheets

(51) Int. Cl.

| | |
|---|---|
| *B01D 61/36* | (2006.01) |
| *B01D 69/02* | (2006.01) |
| *B01D 69/12* | (2006.01) |
| *B01D 71/02* | (2006.01) |
| *B01D 71/52* | (2006.01) |
| *B01D 71/56* | (2006.01) |
| *C02F 1/04* | (2023.01) |
| *C02F 1/12* | (2023.01) |
| *C02F 1/14* | (2023.01) |
| *C02F 1/44* | (2023.01) |
| *C02F 103/08* | (2006.01) |
| *F22B 1/00* | (2006.01) |
| *F24S 23/70* | (2018.01) |

(52) U.S. Cl.
CPC ......... *B01D 61/364* (2013.01); *B01D 61/366* (2013.01); *B01D 69/02* (2013.01); *B01D 69/12* (2013.01); *B01D 71/024* (2013.01); *B01D 71/52* (2013.01); *B01D 71/56* (2013.01); *C02F 1/041* (2013.01); *C02F 1/043* (2013.01); *C02F 1/12* (2013.01); *C02F 1/14* (2013.01); *C02F 1/447* (2013.01); *F24S 23/80* (2018.05); *B01D 2311/06* (2013.01); *B01D 2311/2653* (2013.01); *B01D 2311/2673* (2013.01); *B01D 2313/221* (2022.08); *B01D 2313/243* (2013.01); *B01D 2325/36* (2013.01); *B01D 2325/38* (2013.01); *C02F 2103/08* (2013.01); *C02F 2201/009* (2013.01); *C02F 2301/063* (2013.01); *F22B 1/006* (2013.01)

(56) References Cited

U.S. PATENT DOCUMENTS

| | | | |
|---|---|---|---|
| 2015/0114818 A1* | 4/2015 | Prince | B01D 5/006 203/11 |
| 2017/0173536 A1* | 6/2017 | Nagata | B01D 71/262 |
| 2019/0002310 A1* | 1/2019 | Francis | B01D 61/364 |

* cited by examiner

Cross-section of Pebax/GO- PTFE membrane

Bottom layer (porous PTFE)

Top layer (vapor selective layer)

| Metric | TVC-MD | MD | MSF | MED |
|---|---|---|---|---|
| Energy Efficiency | ★★½ | ★½☆ | ★★☆ | ★★½ |
| Small Scale Operation(< 5000 m³/day flux) | ★★½ | ★★★ | ★½☆ | ★½☆ |
| Solar Integration | ★★½ | ★★½ | ★½☆ | ★★☆ |
| Low Complexity | ★★☆ | ★★★ | ★☆☆ | ★☆☆ |
| Lifetime Costs | ★★☆ | ★☆☆ | ★★☆ | ★½☆ |
| High Salinity Feedwaters | ★★★ | ★★★ | ★★½ | ★★☆ |

Fig. 7

THERMAL VAPOR COMPRESSION MEMBRANE DISTILLATION HYBRID USING VAPOR SELECTIVE MEMBRANES

CROSS-REFERENCE TO RELATED APPLICATIONS

This patent application claims priority to U.S. Provisional Patent Application Ser. No. 63/117,519 filed on Nov. 24, 2020.

BACKGROUND

By 2025, 1.800 billion people are expected to be living in water stressed regions, due to rapid population growth and higher levels of industrialization that exacerbates climate change and extreme weather conditions. In order to meet this growing water demand, it is necessary to improve the capability to use unconventional water sources, such as brackish (low salinity) or seawater. Thanks to the implementation of desalination technologies, this can be achieved.

Even though the energy required by reverse osmosis (RO) for seawater desalination has decreased from almost 17 kWh/m$^3$ in 1970 to 2.5 kWh/m$^3$ today, RO's higher specific energy consumption, when compared to traditional water treatment methods, has been one of the main barriers for the expansion of RO desalination. Almost 50% of the RO operational expenses are related to its elevated energy requirements, which currently consume more than 200 million kWh per day and generate between 0.4 and 6.7 kg $CO_2$ equivalent for every cubic meter of clean water produced.

Coupling renewable energy (RE) such as solar or wind energy with reverse osmosis has been widely studied as an option to decrease both non-renewable energy use and carbon footprint in reverse osmosis plants. But increased adoption of this combination with renewable energy can result in new challenges for the electric grid. For example, conventional power generation systems can follow a variable load by adjusting the energy supply, whereas renewable power sources are non-schedulable due to their daily and seasonal intermittency. Some factors to consider when including renewable sources in the grid are oversupply risk, energy curtailment, decreased frequency response, and short and steep ramps in energy demand and supply.

Current desalination technologies are not adapted to wide daily electricity availability and the associated price fluctuations, and are especially challenged by the intermittency of renewables in islands such as Hawaii and Puerto Rico, military bases, and distributed electric grid areas throughout the US and globally. This increases desalination prices substantially, builds in cost uncertainty, causes temporary shutdowns, increases reliance on fossil fuels, and limits applicable locations. Thus, there remains a need for desalination that is less sensitive to energy availability and energy price. The present novel technology addresses this need.

BRIEF DESCRIPTION OF THE DRAWINGS

FIG. 7 is an Illustration of the advantages of the disclosed invention over prior technology.

DETAILED DESCRIPTION

Figure 1A:
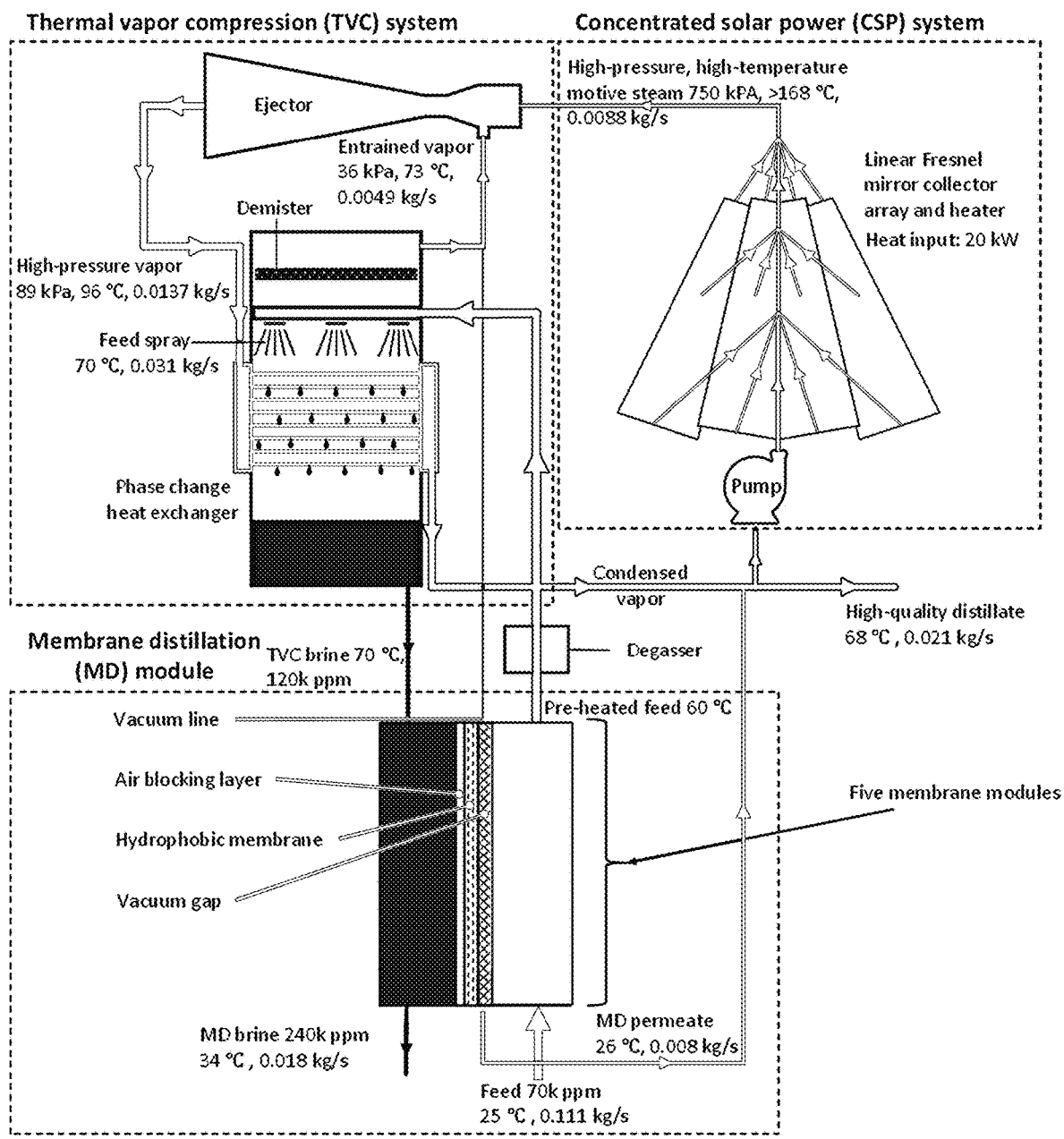
FIG. 1A is a schematic view of a first embodiment of the present invention, a vacuum air gap membrane distillation (V-AGMD) assembly handling thermal vapor compression (TVC) desalination brine for enhanced recovery

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

Sunlight provides very high-quality energy from a thermodynamic perspective, radiating from a source at 5800° C. Because most of the available energy (exergy) from sunlight is available from its high temperatures, desalination and other technologies perform vastly better when they can make use of higher temperatures. However, most thermal desalination technologies run at very low temperatures (<80° C.) because of salt scaling challenges.

Therefore, there often exists a paradox in implementing solar desalination systems, as sunlight is a high-quality energy source capable of reaching very high temperatures. This has led to most solar desalination technologies throwing out the available work from high temperatures, leading to enormous costs of solar components, and second-law of thermodynamics efficiencies in the low single digits or worse. Thus, an innovative combined solar thermal and desalination systems that offer the use of a wide temperature range provides enormous potential for dramatic improvements in energy efficiency.

The novel technology, shown in FIGS. 1A-5, is an innovative solar desalination system that uses a new synergistic design and materials for improved performance and use of high temperatures. Thermal Vapor Compression (TVC) is combined with Vacuum Air Gap Membrane Distillation (V-AGMD), with a novel membrane layer that blocks air but not water vapor, and is powered by a concentrated solar power (CSP) system. This approach achieves higher efficiency by using higher temperatures, and by maximizing AGMD performance with an exceptional vacuum that does not require electrical input. The system is composed of two main components as discussed below.

Thermal Vapor Compression (TVC): TVC makes use of high-temperature steam (>170° C.) to provide low pressures by mixing with the waste steam (such as via an ejector) for efficient spray evaporation. Unlike other desalination technologies, these systems run at high temperatures. Therefore, they can be almost universally paired with other technologies to improve performance with high-temperature heat, such as the large-scale MED-TVC plants, which today are the most efficient thermal desalination approach.

Figure 3A:
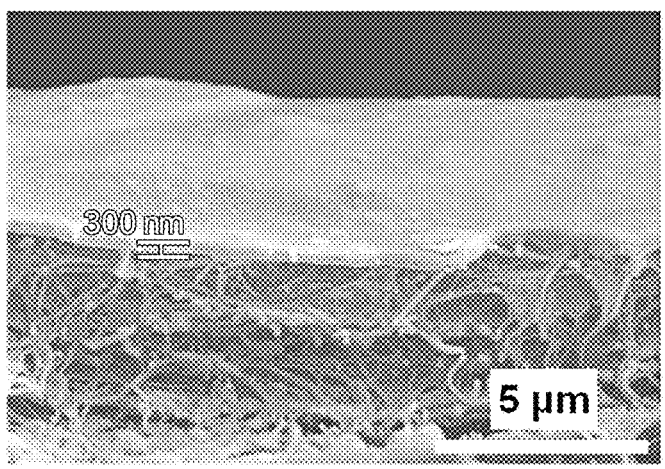
FIG. 3A is an SEM photomicrograph of a cross-section of a novel vapor selective membrane featuring an ultrathin PEBAX/GO layer.
Figure 3B:
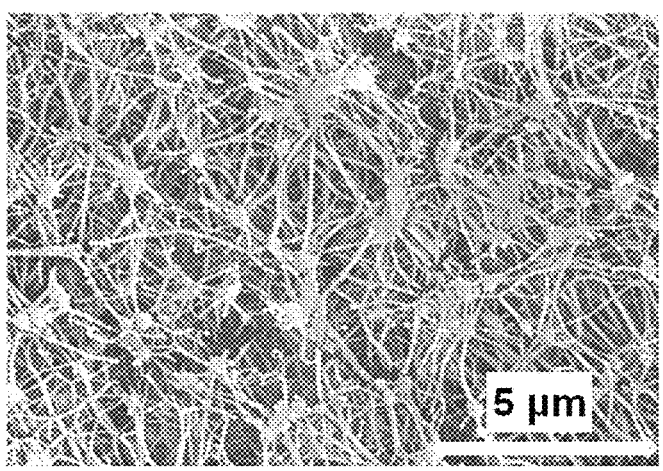
FIG. 3B is an SEM photomicrograph of the bottom surface of the membrane of FIG. 3A, which is a porous hydrophobic layer.
Figure 3C:
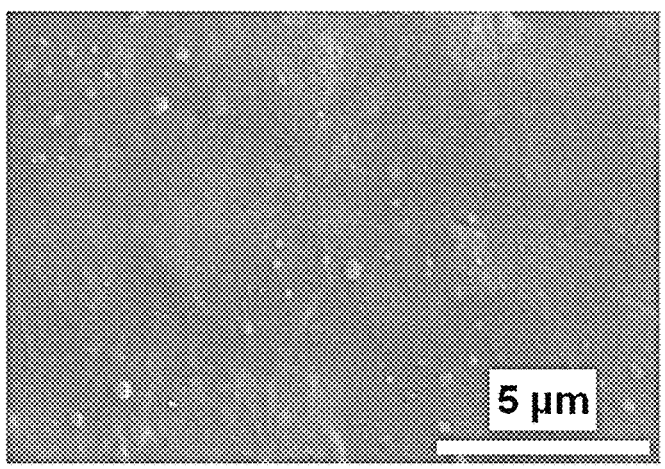
FIG. 3C is an SEM photomicrograph of the top surface of the membrane of FIG. 3A, an ultrathin PEBAX/GO layer (thickness ≈300 nm).

Vapor Selective Membrane: A hydrophobic membrane that is highly porous and permeable to vapor and air is frequently used in membrane distillation applications. By adding a thin dense layer to the hydrophobic membrane, it is possible to favor vapor over air. Proper selection of the thickness and material of this layer allow for achieving high vapor permeability and selectivity. In one embodiment the membrane is composed of an ultrathin hydrophilic block copolymer (in this example, PEBAX 1657) and graphene oxide (GO) nanosheets that are highly permeable to vapor but impermeable to air (PEBAX is a registered trademark, USPTO registration number 1254164, assigned to Arkema France Corporation, 420 Rue d'Estienne d'Orves 92700 Colombes France). The PEBAX/GO composite membrane was prepared using the spray coating method from a 3 wt % PEBAX solution in a 70/30 ethanol/water mixture and 2 wt % GO (based on the weight of the polymer). The 3 wt % solution of PEBAX in ethanol/water was prepared by dissolving the polymer for 4 hours at 80° C. The GO portion was prepared by dispersion of GO in water using a bath sonicator for 4 hours to yield a GO suspension. The GO suspension was then added to the PEBAX solution. To obtain a blend solution, the mixture was stirred for 24 hours using a magnetic stirrer. Then, a 20 g solution was sprayed from a distance of 10 cm using an airbrush onto a 16 cm×5 cm PTFE membrane. After a brief period, the coated membrane was removed and allowed to dry at room temperature for 10 hours before being placed in a vacuum oven at 40° C. for 24 hours to remove any remaining solvent. SEM images of the cross-section, bottom surface, and top surface of the ultrathin PEBAX/GO composite membrane are shown in FIGS. 3A-3C. This innovative composite membrane allows the achievement of uniquely high vacuum, containing vapor and not air, leading to dramatic increases MD flux. This occurs because without air present to displace condensed vapor, extreme pressure gradients can occur from condensation.

Figure 2A:
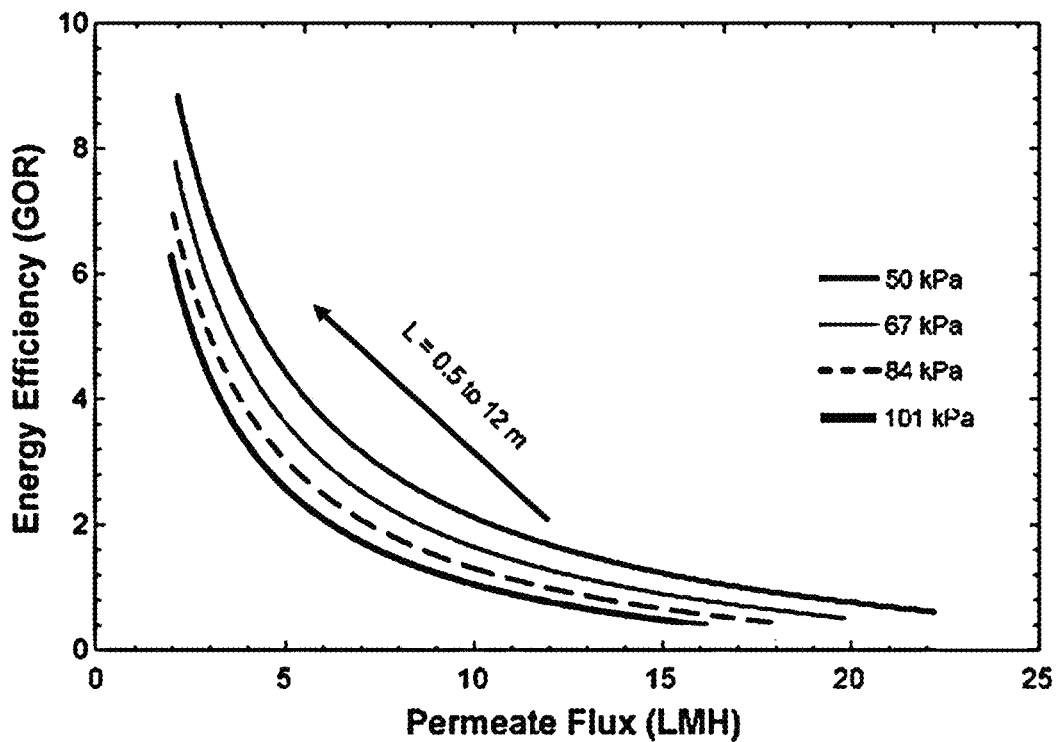
FIG. 2A graphically illustrates the relationship between energy efficiency and permeate flux at different pressure isobars with $T_{HOT}$=80 degrees Celsius.
Figure 2B:
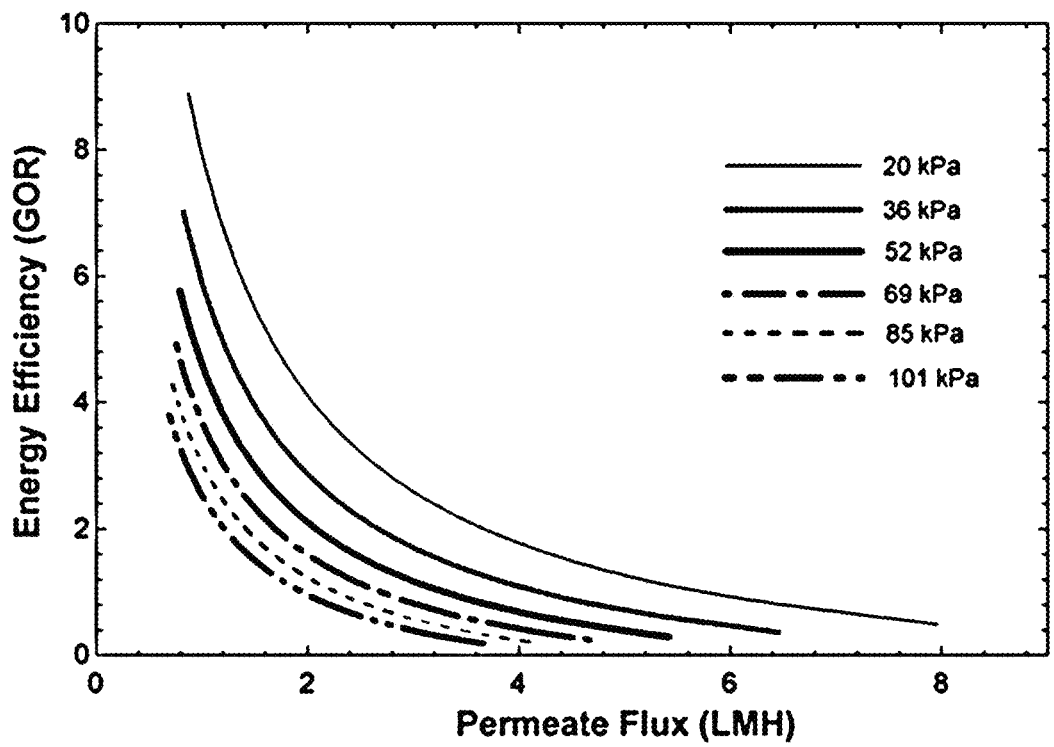
FIG. 2B graphically illustrates the relationship between energy efficiency and permeate flux at different pressure isobars with $T_{HOT}$=50 degrees Celsius.
Figure 4A:
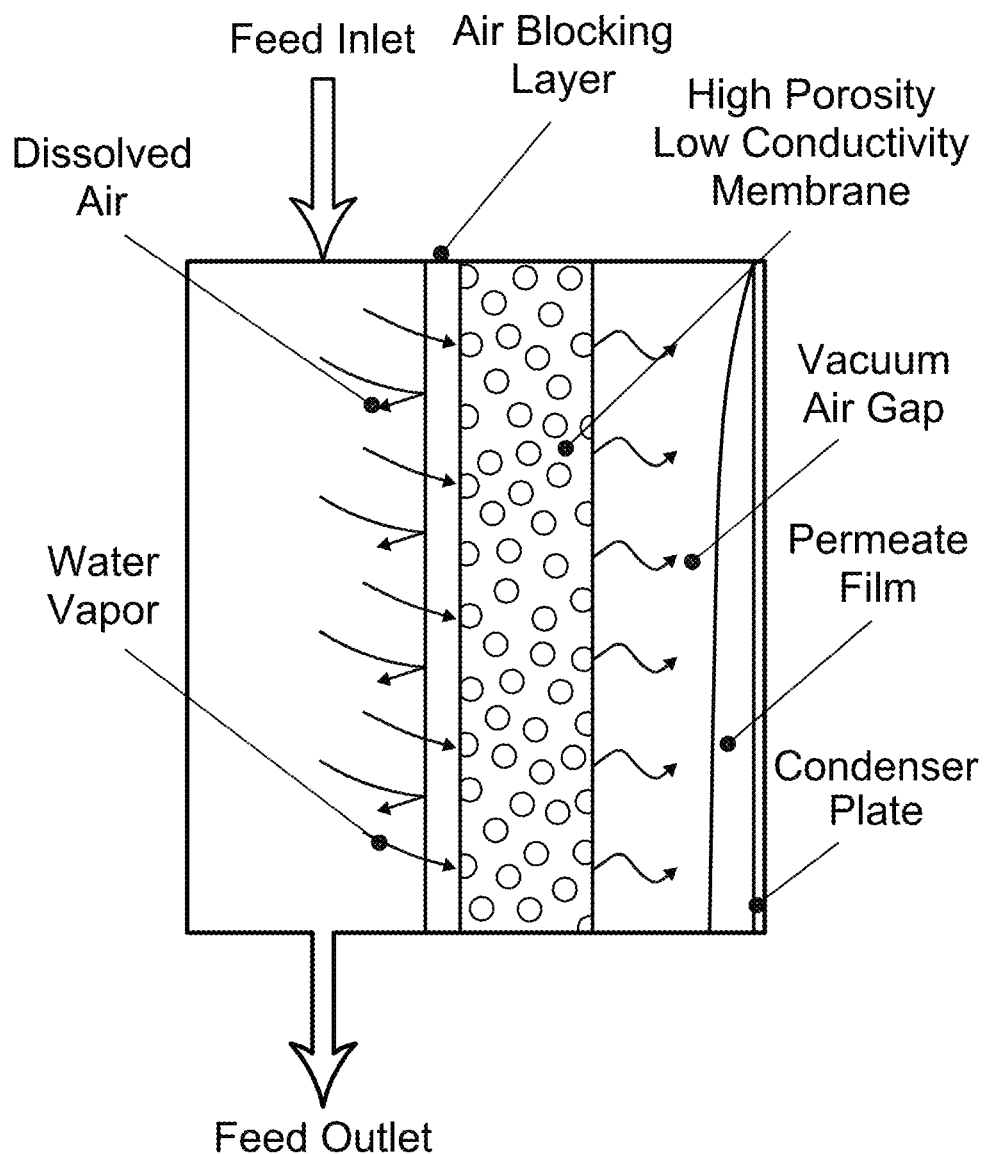
FIG. 4A is a schematic vie of a cross-section of the air-blocking membrane of FIG. 3A.
Figure 4B:
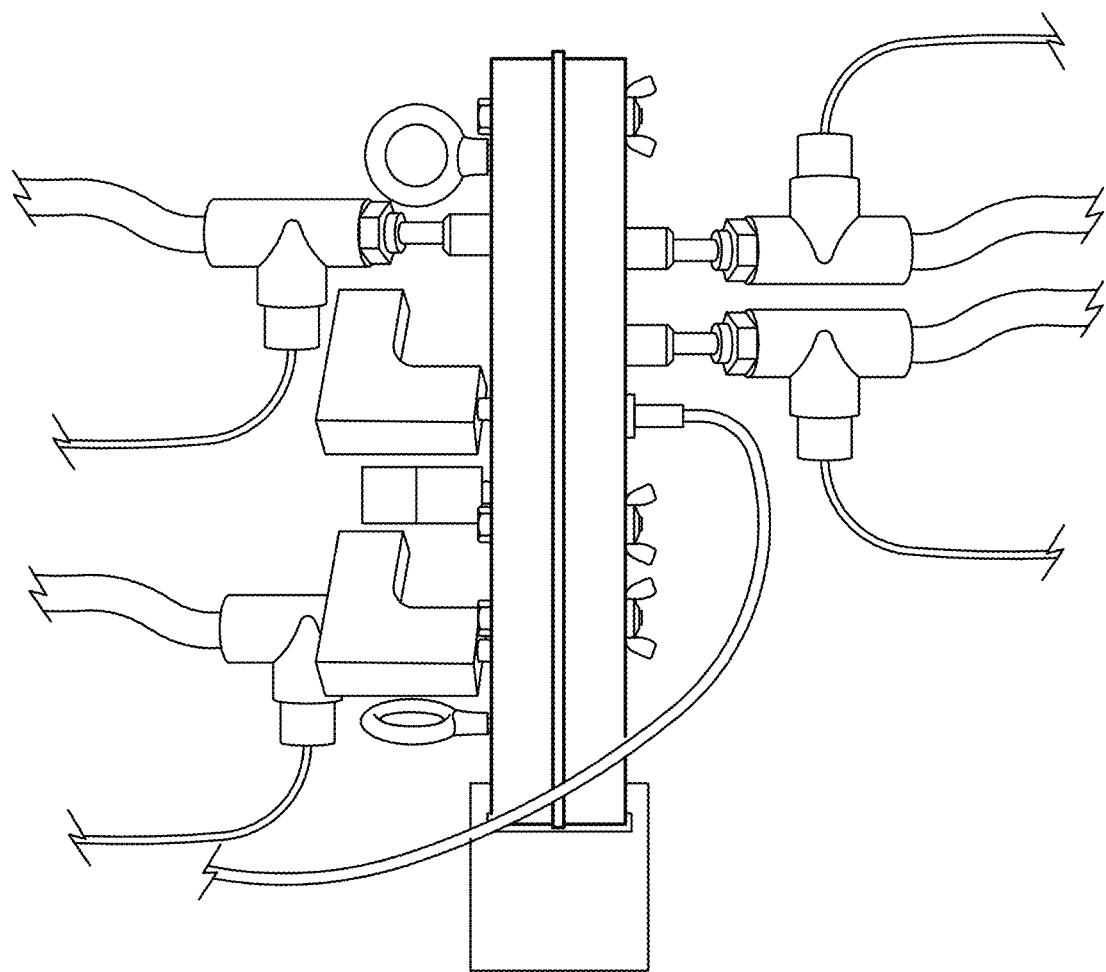
FIG. 4B is a front plan view of a lab-scale version of the assembly of FIG. 1A.
Figure 4C:
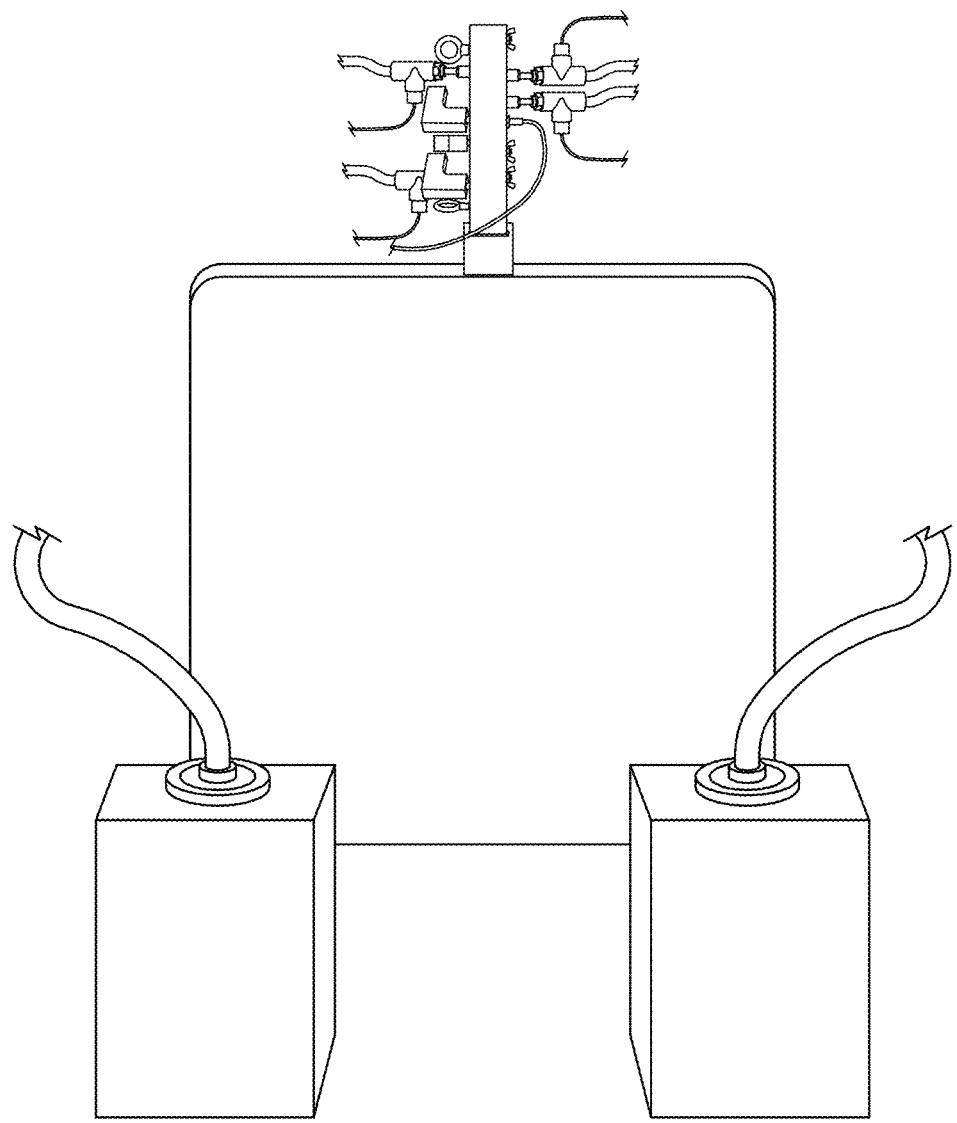
FIG. 4C is a front plan view of a lab-scale version of a controller for use with the assembly of FIG. 1A.

Vapor Selective V-AGMD: Air gap membrane distillation, or AGMD, has shown to be a quite efficient membrane distillation technology for high salinities. The main inefficiency is that heat transfer continues to occur by conduction through the gap. Often, vacuum-gap configurations have been proposed to reach high efficiency in multistage designs, but these require complex systems and large amounts of vacuum pumping work (e.g., >2 kWh/m3). The novel reduced pressure V-AGMD system detailed herein maintains the vacuum created by the steam ejector using the above-described novel hydrophobic PEBAX polymer membrane layer that blocks air but not water vapor, yielding the capability in membrane distillation (MD) to achieve very low vacuum pressure. This allows for maintaining an effective vacuum with minimal energy input, as no dissolved gases can get in. This also eliminates the need for a vacuum pump. Transfer of latent heat of condensation across the gap in the MD module allows the feed to be pre-heated before it is sprayed into the TVC evaporator. Motive steam for driving the TVC system is provided by a concentrated solar power (CSP) assembly. FIG. 1A shows the overall system clearly. For the sake of simplicity, the second feed pre-heater used for thermally balancing the TVC system is not shown in the figure. FIGS. 2A-2B show the improved performance from running at a lower pressure. Performance improvements have been modelled for a V-AGMD system treating seawater salinity feed (35 g/kg) with an air gap of 1 mm. Polypropylene membrane with 200 μm thickness and particular air properties is considered for the analysis. Finally, the geometrical parameters of a commercial spiral wound MD module have been adopted for practical scale quantifications. FIGS. 4A-4C show a lab-scale MD setup with 400 liters of feedwater per hour capacity. The module has an active membrane area of 60 cm$^2$ with the ability to run different configurations like AGMD, VMD (at gap sizes ranging from 1-3 mm) and DCMD. Thermal input is derived from an external electrical heater capable of achieving peak temperatures of around 90° C.

High-temperature heat source: The ejector of the TVC system is driven by a high quality heat source-concentrated solar power (CSP) using an array of Fresnel mirrors to produce superheated steam which in turn drives the ejector as shown in FIG. 1. In doing so, high temperature solar heat is partly used to drive the ejector and result in the compression process. During compression, the temperature of the motive steam is lowered while that of the entrained vapor is raised. Thus, the compressed vapor can act as a constant low temperature heat source for evaporation (during phase change) leading to low entropy generation.

Figure 5:
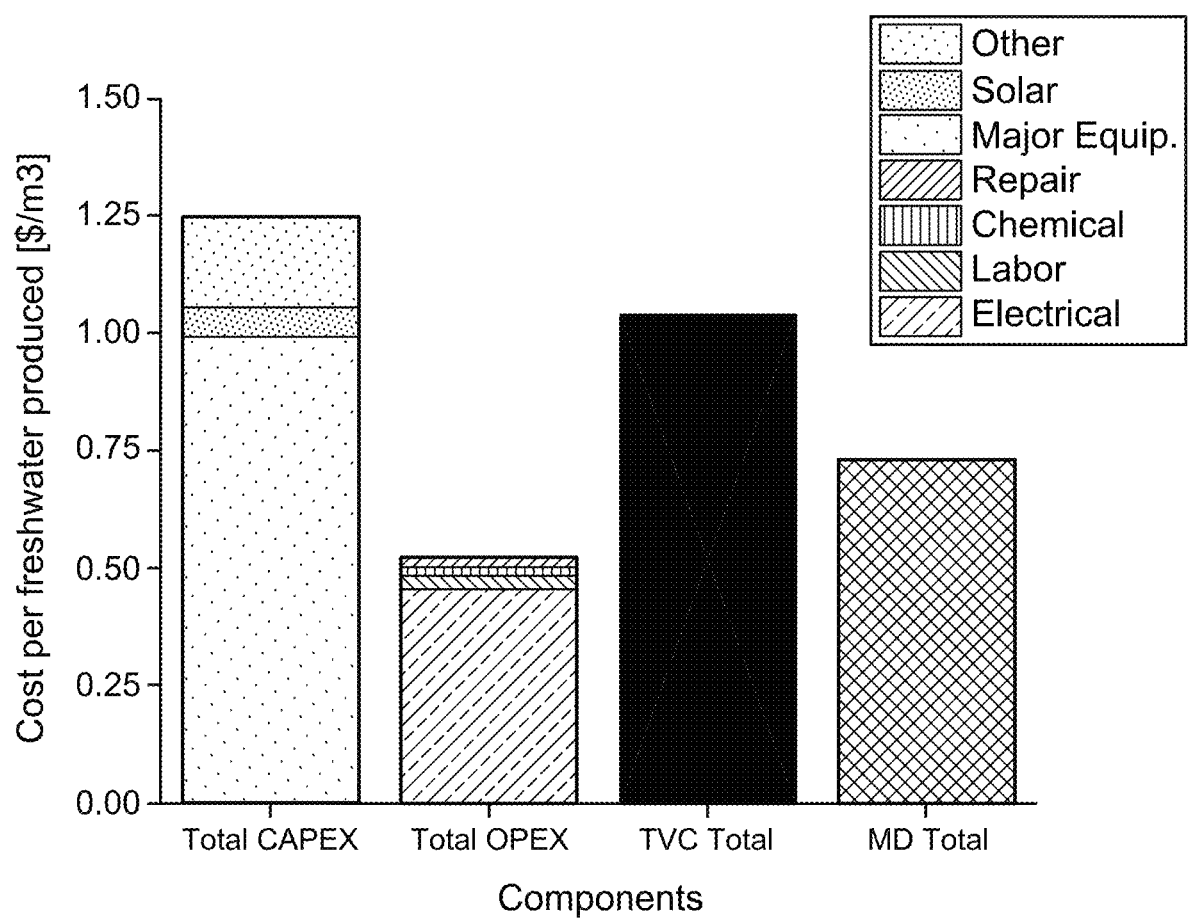
FIG. 5 is a graphic representation of cost per freshwater produced as a function of components for the system of FIG. 1A.

FIG. 5 represents the capital and operating costs for the combined system. The costs for the thermal components appear lower than some literature, but this is expected since literature values incorporate lifetime energy costs, which we have replaced with capital costs from CSP. FIG. 7 illustrates the numerous advantages of the instant novel TVC-MD system compared to existing technologies. It is shown that the high energy efficiency, coupled with its suitability for small-scale application as well as tolerance with respect to high salinity feedwaters, are among the features that have made the system unique.

Figure 6:
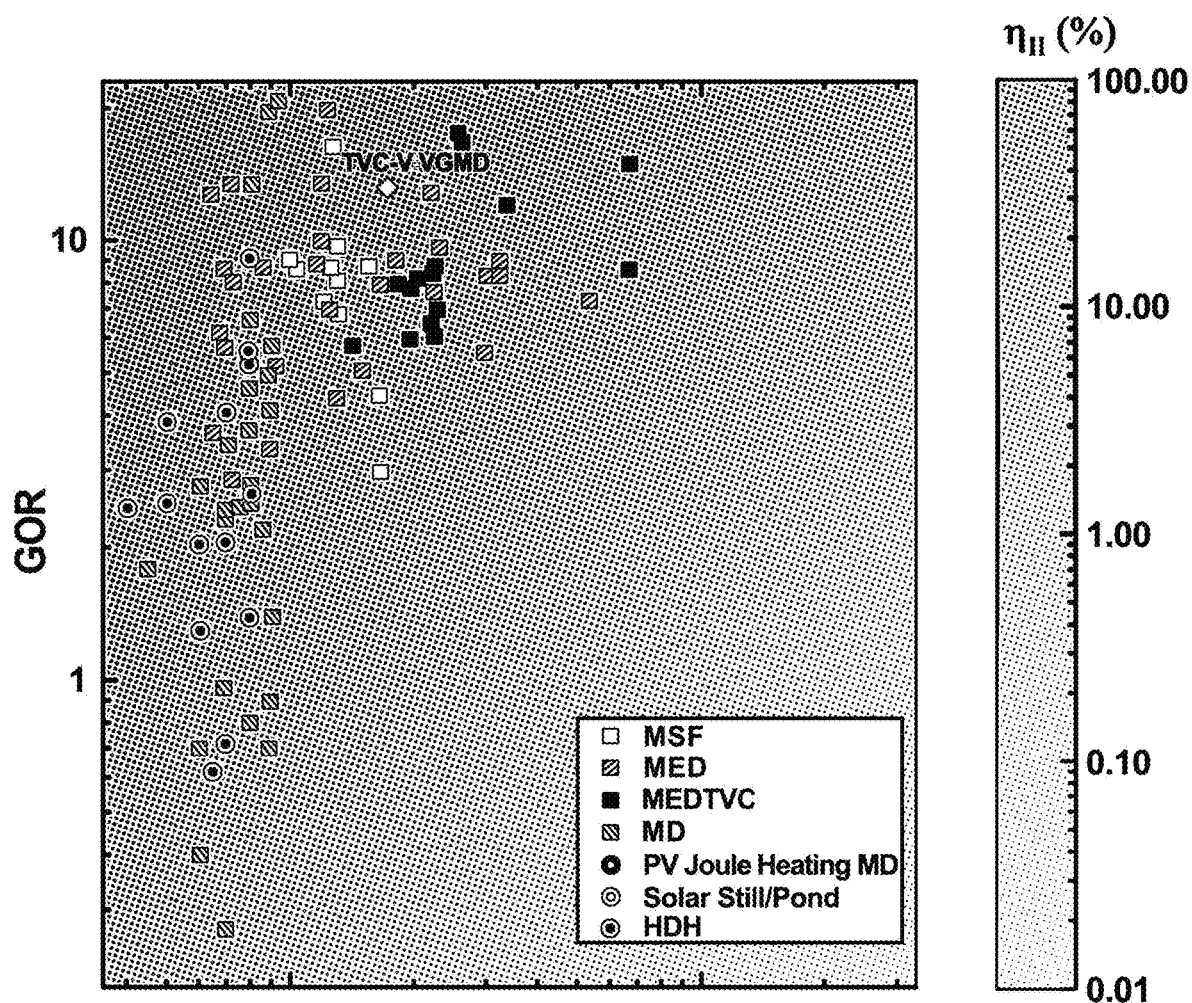
FIG. 6 is a graphic representation of system efficiency as a function of Thor for the system of FIG. 1A.

FIG. 6 shows the energy and temperature comparison of major desalination technologies, by GOR (first law efficiency) and a mapping of the second law efficiency. Higher temperature heat sources (TH) offer more available work, and thus GOR could be higher.

EXAMPLE

The mass balance for different streams has been demonstrated in the schematic of the desalination assembly 100 in FIG. 1A. The assembly 100 includes a membrane distillation module 105, a solar power concentration module 110, and a thermal compression module 115, all operationally connected to one another. The MD component 105 is attractive for its simplicity, and the vacuum component 115 is further simplified by using an ejector 120 instead of a complex, prone-to-breakdown vacuum pump.

The MD portion 105 includes a first vessel 125 having a first portion 130 and a second portion 135 separated by a hydrophobic membrane 140 operationally connected therebetween and oriented to pass water from the first portion 130 to the second portion 135. The hydrophobic membrane 140 includes a hydrophilic membrane 145, such as an ultrathin hydrophilic block copolymer adjacent and operationally connected to an air blocking layer 150, one that is highly permeable to vapor but impermeable to air, such as graphene oxide (GO) sheeting. A vacuum gap 155 is disposed adjacent the hydrophobic membrane 140 and disposed in the second portion 135. A first fluid inlet 160 and a first fluid outlet 165 are operationally connected to the first portion 130. A second fluid inlet 170 and a second fluid outlet 175 operationally connected to the second portion 135.

The solar concentrating portion 110 includes a pump 180 having a pump outlet 185 and a pump inlet 190 operationally connected to a water line 195 and to the vacuum gap 155. A linear Fresnel mirror collector array 200 for collecting and focusing sunlight is positioned to receive sunlight as well as water from the pump outlet 190, such as via an outlet line 205 operationally connected to the pump outlet 190 and positioned to receive focused sunlight from linear Fresnel mirror collector array 200.

The thermal vapor compression portion 115 includes an ejector 120 having an ejector inlet portion 210 and an ejector outlet portion 215, wherein the ejector inlet portion 210 is operationally connected to the outlet line 205 and to the vacuum gap 155. A second vessel 220 is fluidically connected to the outlet portion 215 and includes a heat exchanger 225 operationally connected to the ejector outlet portion 215 and to the water pipe 195. A feed sprayer 230 is operationally connected to the second outlet 175 and positioned to spray into the heat exchanger 225. A collection portion 235 is positioned for receiving concentrated feed spray 240. A degasser 245 may be operationally connected to the second portion 135 and to the feed sprayer 230. The heat exchanger 225 receives desalinated water from the ejector 120 and from the feed spray 240. The water line 195 carries desalinated water from the heat exchanger 225. The first outlet 165 passes concentrated brine and the first inlet 160 receives feed water to be desalinated.

The combined solar-MD technology approach is highly feasible. TVC is applied at industrial large-scale for a substantial fraction of all MED thermal desalination plants. While the composite vapor-selective membrane is new to desalination, vapor selective gas-separation membranes for HVAC applications have been demonstrated successfully in the literature.

Treating high-salinity water, the sustainability of the system under such conditions and high operating costs have always been a challenge in the desalination industry. The proposed technology is not only able to treat very high-salinity waters such as produced water with a TDS of at least 70,000 ppm, but also it has lowered the energy consumption, costs, and scale depositions through its novel design. Also, the system has eliminated the use of high-maintenance vacuum pumps and still benefits from operating at low-scaling conditions by evaporating water under partial vacuum.

ALTERNATE EMBODIMENTS

In one embodiment, the vacuum required initially in V-VGMD is obtained from the ejector operating for the TVC system but other techniques can be used that do not require electrical energy. The addition of the vapor selective-air blocking layer facilitates the usage of alternative low pressure generation methods like water columns, low energy vacuum pumps (similar to the ones used in V-AGMD) or using controlling valves that can permit intermittent and continuous vacuum conditions using the ejector.

In another embodiment, multiple V-AGMD systems can be operated in series to retrieve the sensible heat of the product water stream coming out of the TVC system and achieve high salinity desalination. The TVC permeate stream would act as the top heat source for the V-AGMD systems, thereby improving the overall energy efficiency of the TVC-MD hybrid and allowing desalination across a wide range of temperatures and salinities. The ejector vacuum line can be used to maintain low gap pressures inside the V-AGMD modules eliminating the extra vacuum pumping costs when multi-staging. Conventional TVC systems need heat exchangers to balance the thermal load associated in the desalination process and the V-AGMD modules can serve that purpose with the added benefit of high salinity desalination since MD systems closely resemble heat exchangers.

In a typical multistage TVC-VAGMD hybrid system, seawater would enter the first V-AGMD module and receive heat input from the high temperature TVC permeate stream. Thereafter, its temperature would decrease, and salinity would slightly increase from desalination in the first V-AGMD module resulting in some permeate production. Thereafter, the feed would move to the cold channel of the second V-AGMD module where the hot side would be governed by the high salinity brine coming out from the TVC system. This module would be the driver for high salinity desalination and since the incoming feed from ambient conditions has been preheated by the first V-AGMD module the high salinity treatment of the TVC brine would be more effective. The feed from the cold channel of the second V-AGMD module is then supplied to the TVC system for high temperature desalination.

In another embodiment, the MD system may be implemented as a standalone set-up that doesn't need an adjoining TVC system for operation. The presence of the air blocking layer on the hydrophobic MD membrane allows the vacuum to be sustained once pulled. Operation would be similar to a vacuum gap MD system with the vapor condensing on the cold side. As mentioned above, the vacuum may be initially pulled using a pump, a tall water column, or the like.

In still another embodiment, the vapor may also be condensed outside the MD module in an external condenser which would in turn would make the design of the cold side less constrained. One possible arrangement would be to use the ejector vacuum to pull out the vapor from the gap in the MD module and condense it in the TVC system after passing it through a demister.

Figure 1B:
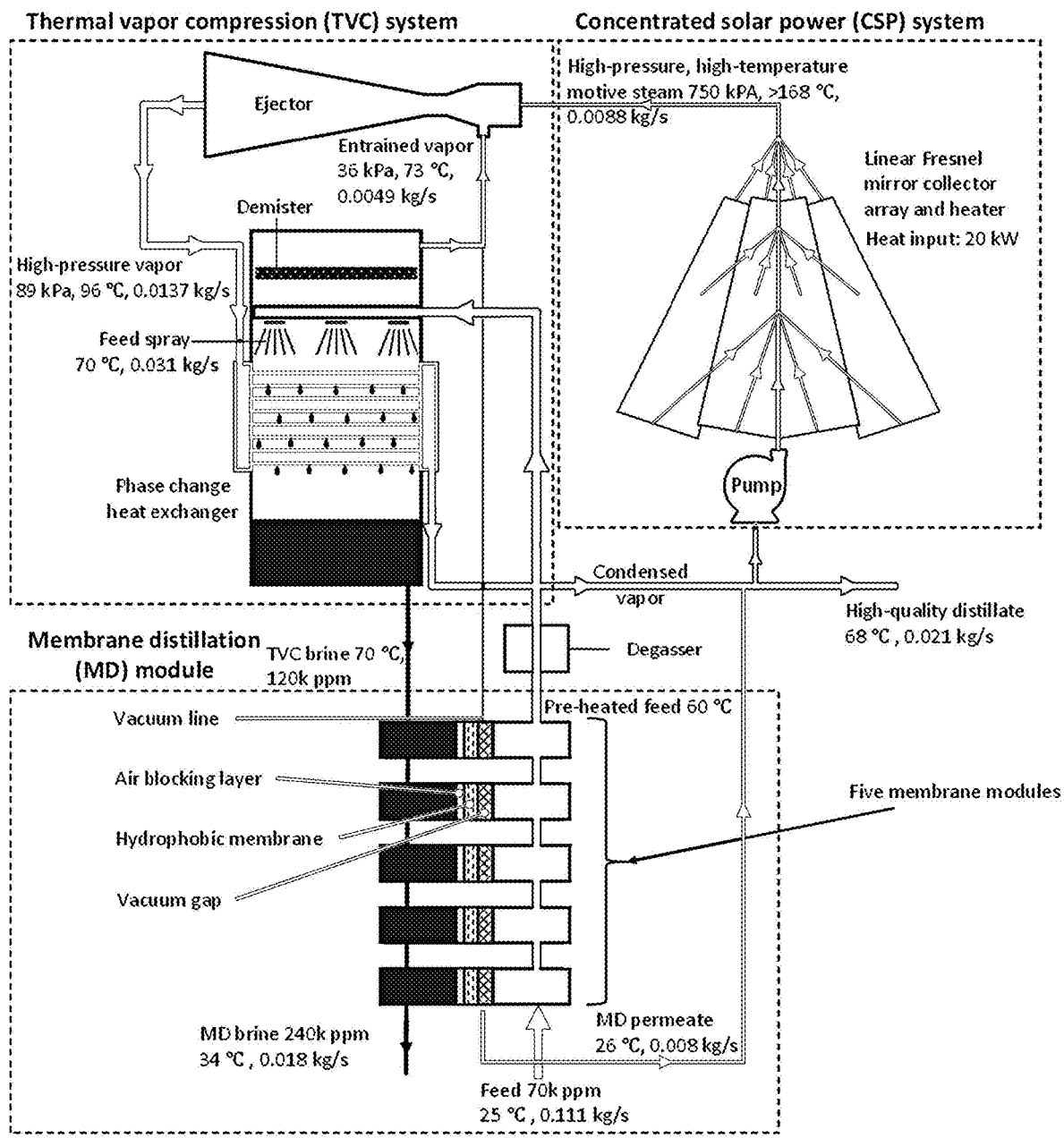
FIG. 1B is a schematic view of the system of FIG. 1A, but with the membrane distillation module broken into a plurality of sub-modules.

In some embodiments, upon introduction of vacuum in the gap of MD systems the temperature at which condensation occurs also decreases and so the module is essentially split into several sections of small lengths operating at different temperature ranges (see FIG. 1B). The maximum vacuum that we can pull in the gap would depend on these temperature ranges and so partitioning the MD module helps in optimizing the performance at the individual length scales. An added benefit of having smaller modules in series and especially working in parallel is that the incoming brine from the TVC system can be segregated into different streams that operate at low temperatures allowing for lower pressures which can yield high recoveries.

In yet another embodiment, the condensation mass and heat transfer resistances can be significantly reduced by implementing novel condensation surfaces that promote dropwise and jumping droplet regimes. This improves the energy efficiency of the process, allows for better heat recovery, and also reduces the area required for in-module condensation.

Additional methods of reducing the air content include the addition of a deaerator to the system, for the low temp water, and/or after TVC. Likely the addition of a deaerator after TVC on the feed is more typical.

Also, a valve that closes between the TVC and MD module to hold the vacuum may be added.

To remove the water from other vacuum, options include a pump, drainage after a water column whose height is sized for the appropriate pressure, and removing water vapor in cycles, alternated by removing air via the TVC.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

We claim:

1. A desalination assembly comprising:
   a first module comprising:
   a first vessel having a first portion and a second portion separated by a hydrophobic membrane operationally connected therebetween and oriented to pass water from the first portion to the second portion;
   an air blocking layer adjacent the hydrophobic membrane and disposed in the first portion;
   a vacuum gap adjacent the hydrophobic membrane and disposed in the second portion;
   a first fluid inlet and a first fluid outlet operationally connected to the first portion; and
   a second fluid inlet and a second fluid outlet operationally connected to the second portion;
   a second module comprising:
   a pump having a pump outlet and a pump inlet operationally connected to a water line and to the vacuum gap;
   a linear Fresnel mirror collector for collecting and focusing sunlight;
   an outlet line operationally connected to the pump outlet and positioned to receive focused sunlight from the linear Fresnel mirror collector;
   a third module further comprising:
   an ejector having an ejector inlet portion and an ejector outlet portion, wherein the ejector inlet portion is operationally connected to the outlet line and to the vacuum gap;
   a second vessel fluidically connected to the ejector outlet portion comprising:
   a heat exchanger operationally connected to the ejector outlet portion and to the water line;
   a feed spray operationally connected to the second fluid outlet and positioned to spray into the heat exchanger;
   a collection portion for receiving concentrated feed spray; and
   a degasser operationally connected to the second portion and to the feed spray;
   wherein the heat exchanger receives desalinated water from the ejector and from the feed spray;
   wherein the water line carries desalinated water from the heat exchanger;
   wherein the first fluid outlet passes concentrated brine; and
   wherein the first fluid inlet receives feed water to be desalinated.

2. The assembly of claim 1 wherein a vacuum line extends between the ejector inlet portion and the vacuum gap.

3. The assembly of claim 1 wherein the outlet line carries steam in excess of 168 degrees Celsius to the ejector inlet portion.

4. The assembly of claim 3 wherein passage of steam through the ejector inlet portion generates a partial vacuum in the vacuum gap.

5. The assembly of claim 1 wherein the first portion is maintained at a temperature bout 10 degrees Celsius higher than the second portion.

6. The assembly of claim 1 wherein the water line carries desalinated water at about 70 degrees Celsius from the heat exchanger.

7. The assembly of claim 1 wherein a degasser is operationally connected between the second fluid outlet and the feed spray.

8. The assembly of claim 1 where the hydrophobic membrane further comprises a hydrophilic layer and a graphene oxide nanosheet layer disposed thereupon.

9. The assembly of claim 8 wherein the hydrophilic layer is an ultrathin hydrophilic block copolymer.

10. A desalination system, comprising:
    a membrane distillation portion, comprising:
    a first vessel having a first portion and a second portion separated by a hydrophobic membrane operationally connected therebetween and oriented to pass water from the first portion to the second portion, wherein the hydrophobic membrane comprises a hydrophilic membrane and an air blocking layer connected to the hydrophilic membrane and disposed in the first portion;
    a vacuum gap adjacent the hydrophobic membrane and disposed in the second portion;
    a first fluid inlet and a first fluid outlet operationally connected to the first portion; and
    a second fluid inlet and a second fluid outlet operationally connected to the second portion;
    a solar power concentration portion, comprising:
    a pump having a pump outlet and a pump inlet operationally connected to a water line and to the vacuum gap;
    a linear Fresnel mirror collector for collecting and focusing sunlight;
    an outlet line operationally connected to the pump outlet and positioned to receive focused sunlight from the linear Fresnel mirror collector;
    a thermal vapor compression portion operationally connected to the membrane distillation portion and to the solar power concentration portion, and further comprising:
    an ejector having an ejector inlet portion and an ejector outlet portion, wherein the ejector inlet portion is operationally connected to the outlet line and to the vacuum gap;
    a second vessel fluidically connected to the ejector outlet portion and further comprising:
    a heat exchanger operationally connected to the ejector outlet portion and to a water pipe;

a feed spray operationally connected to the second fluid outlet and positioned to spray into the heat exchanger;
   a collection portion for receiving concentrated feed spray;
   wherein the heat exchanger receives desalinated water from the ejector and from the feed spray;
   wherein the water line carries desalinated water from the heat exchanger;
   wherein the first fluid outlet passes concentrated brine; and
   wherein the first fluid inlet receives feed water to be desalinated.

11. The system of claim 10, wherein the membrane distillation portion defines a plurality of sub-portions operationally connected to one another.

12. The system of claim 11 wherein all respective sub-portions are functionally identical to one another.

13. The system of claim 10 and further comprising a degasser operationally connected to the second portion and to the feed spray.

\* \* \* \* \*